United States Patent
Watanabe et al.

(10) Patent No.: US 7,427,093 B2
(45) Date of Patent: Sep. 23, 2008

(54) MOUNTING STRUCTURE FOR VEHICLE BATTERY PACK

(75) Inventors: Ko Watanabe, Nishikamo-gun (JP); Shuji Nagase, Toyota (JP); Keiji Shukuya, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 127 days.

(21) Appl. No.: 10/579,894

(22) PCT Filed: Nov. 24, 2004

(86) PCT No.: PCT/JP2004/017831

§ 371 (c)(1),
(2), (4) Date: May 19, 2006

(87) PCT Pub. No.: WO2005/051697

PCT Pub. Date: Jun. 9, 2005

(65) Prior Publication Data

US 2007/0128507 A1   Jun. 7, 2007

(30) Foreign Application Priority Data

Nov. 28, 2003   (JP)   ............... 2003-399682

(51) Int. Cl.
*B60R 27/00* (2006.01)

(52) U.S. Cl. .................................. 296/37.15

(58) Field of Classification Search ............... 296/37.15
See application file for complete search history.

(56) References Cited

U.S. PATENT DOCUMENTS

| 4,514,008 A * | 4/1985 | Watanabe et al. ............ 296/204 |
| 2002/0021015 A1* | 2/2002 | Kronner et al. ........... 296/37.15 |

FOREIGN PATENT DOCUMENTS

| JP | 59-065463 | 5/1984 |
| JP | 07-156826 A | 6/1995 |
| JP | 09-226632 A | 9/1997 |
| JP | 11-099832 A | 4/1999 |
| JP | 2000-233648 A | 8/2000 |
| JP | 2000-238541 A | 9/2000 |
| JP | 2001-138573 A | 5/2001 |
| JP | 2001-233064 A | 8/2001 |
| JP | 2003-170748 A | 6/2003 |
| JP | 2003-300419 A | 10/2003 |
| JP | 2004-017808 A | 1/2004 |

\* cited by examiner

*Primary Examiner*—Lori L Lyjak
(74) *Attorney, Agent, or Firm*—Kenyon & Kenyon LLP (57) ABSTRACT

To provide a mounting structure for a vehicle battery pack which prevents damage to the vehicle battery pack and has improved safety, a mounting structure for a vehicle battery pack has a body with a floor panel, a front seat provided on the floor panel, a vehicle battery pack provided under the front seat, and a protection member provided on a vehicle rear side relative to the vehicle battery pack and protecting the vehicle battery pack. The protection member can be fastened to the body.

9 Claims, 7 Drawing Sheets

MOUNTING STRUCTURE FOR VEHICLE BATTERY PACK

This is a 371 national phase application of PCT/JP2004/017831 filed 24 Nov. 2004, which claims priority to Japanese Patent Application No. JP 2003-399682 filed 28 Nov. 2003, the contents of which are incorporated herein by reference.

TECHNICAL FIELD

The present invention relates to a mounting structure for a vehicle battery pack, and more particularly, a mounting structure for a battery pack for a vehicle such as an electric vehicle using a generator as a drive source.

BACKGROUND ART

Recently, an electric vehicle using an electric motor as a drive source, and a so-called hybrid vehicle having a plurality of types of drive sources such as an electric motor and a gasoline engine have been in practical use.

Such a vehicle as an electric vehicle is provided with a battery for supplying electricity as energy to a generator or the like. As the battery for this application, a secondary battery capable of being charged and discharged repeatedly, such as a nicad (Ni—Cd) battery or a nickel-hydride battery, is used.

A structure for mounting a battery in a vehicle is disclosed for example in Japanese Patent Laying-Open No. 2000-233648.

SUMMARY OF THE INVENTION

In a conventional mounting structure, however, the battery is placed at a position where a footrest for a passenger in a rear seat is placed, and the main body of a battery pack or a surrounding cooling pipe may be kicked and damaged.

The present invention has been made to solve the aforementioned problem, and one object of the present invention is to provide a mounting structure for a vehicle battery pack preventing damage to the vehicle battery pack and having improved safety.

A mounting structure for a vehicle battery pack in accordance with the present invention includes a body with a floor panel, a seat provided on the floor panel, a vehicle battery pack provided under the seat, and a protection member provided on a vehicle rear side relative to the vehicle battery pack and protecting the vehicle battery pack. The floor panel has a tunnel extending from a vehicle front portion to a vehicle rear portion of the body, and a rocker provided on a side of the floor panel to extend parallel to the tunnel. The vehicle battery pack is provided between the tunnel and the rocker.

In the mounting structure for a vehicle battery pack formed as described above, since the protection member is provided on the vehicle rear side relative to the vehicle battery pack, it can protect the vehicle battery pack against an impact from behind. For example, the protection member can protect the vehicle battery pack against a kick by a passenger in a rear seat. Further, when the vehicle battery pack is provided under a seat in the last row, the protection member can prevent the vehicle battery pack from being hit by luggage and others in a trunk room.

Furthermore, the protection member can be utilized as a member forming a footstep for a passenger in the rear seat, by devising the shape of the protection member.

More preferably, the protection member is fastened to the body. In this case, fastening the protection member to the body eliminates the need to reinforce the vehicle battery pack itself. Therefore, weight reduction can be achieved.

More preferably, the seat is a front seat.

A mounting structure for a vehicle battery pack in accordance with the present invention includes a body with a floor panel, a first seat provided on the floor panel, a second seat provided on a vehicle rear side of the first seat, and a vehicle battery pack provided under the first seat. The vehicle battery pack includes a battery main body unit and a device unit, and the device unit is provided on the vehicle rear side relative to the battery main body unit.

In the vehicle battery pack formed as described above, since the device unit is provided on the vehicle rear side, a footrest for a passenger in the second seat can be obtained. Further, damage by a kick can be avoided.

Preferably, a distance from a bottom surface of the first seat to a top of the device unit is greater than a distance from the bottom surface of the first seat to a top of the battery main body unit. In this case, since the distance from the bottom surface of the first seat to the top of the device unit is greater, a passenger can easily insert his/her feet between the bottom surface of the first seat and the device unit. Also, this structure can suppress the device unit from being kicked. Further, since there is a greater distance from the toe of a passenger to the vehicle battery pack, damage can be prevented.

Preferably, a portion of the floor panel in which the device unit is mounted is lower than a portion of the floor panel in which the battery main body unit is mounted.

Preferably, a portion of the floor panel in which the battery pack is mounted is lower than the floor panel surrounding the portion.

Preferably, the top of the device unit is substantially level with the floor panel on the vehicle rear side relative to the device unit.

Preferably, the first seat is a front seat.

DETAILED DESCRIPTION

Hereinafter, embodiments of the present invention will be described with reference to the drawings. It is to be noted that, in the following embodiments, identical or corresponding parts will be designated by the same reference numerals, and the description thereof will not be repeated.

FIRST EMBODIMENT

Figure 1:
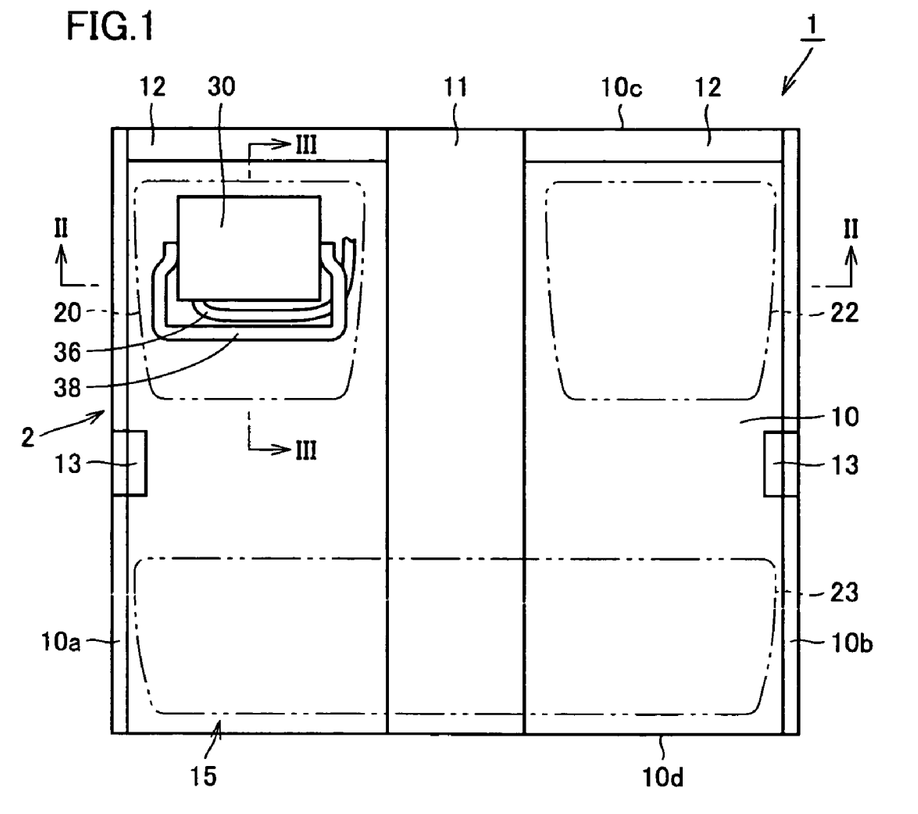
FIG. 1 is a plan view of a mounting structure for a vehicle battery pack in accordance with a first embodiment of the present invention.

FIG. 1 is a plan view of a mounting structure for a vehicle battery pack in accordance with a first embodiment of the present invention. Referring to FIG. 1, a mounting structure 1 for a vehicle battery pack in accordance with the first embodiment of the present invention includes a body 2 forming a vehicle body and having a floor panel 10, a front seat 20 as a seat provided on floor panel 10, a vehicle battery pack 30 provided under front seat 20, and a protection member 38 provided on a vehicle rear side relative to vehicle battery pack 30 and protecting vehicle battery pack 30.

In a cabin 15, a tunnel 11 is provided on floor panel 10 of body 2, extending from a vehicle front portion 10c to a vehicle rear portion 10d. Vehicle front portion 10c is located on a vehicle front side, and vehicle rear portion 10d is located on the vehicle rear side. Tunnel 11 is provided to be raised from the surface of floor panel 10, serving to increase the strength of floor panel 10. Further, tunnel 11 also serves as a space accommodating exhaust system parts and various cables within a concave portion formed by tunnel 11. Tunnel 11 is provided in a rib-like shape.

A front cross-member 12 is provided on floor panel 10 to be substantially perpendicular to the direction in which tunnel 11 extends. Front cross-member 12 is formed to extend from a vehicle left side to a vehicle right side. Rockers 10a and 10b are provided on the sides of floor panel 10 to extend parallel to tunnel 11. A center pillar 13 is provided on rockers 10a and 10b.

Vehicle battery pack 30 is provided on floor panel 10, in a region surrounded by tunnel 11, front cross-member 12, and rocker 10a. Vehicle battery pack 30 includes a battery module, a fan for cooling the battery module, and an ECU for controlling the battery module.

Vehicle battery pack 30 has a shape of a substantially rectangular parallelepiped, accommodating therein a plurality of battery modules (not shown). It is to be noted that the battery module can be formed using various batteries such as a lead acid battery, a nickel-cadmium battery, a nickel-hydride battery, or a lithium battery. The battery module includes a plurality of battery cells. Instead of the battery module, a battery single cell may be used. The battery single cell includes one battery cell.

A wire harness 36 is connected to the battery module via an electrical junction box. Wire harness 36 serves to draw electricity stored in vehicle battery pack 30 and supply electricity to vehicle battery pack 30. Wire harness 36 is provided on the vehicle rear side relative to vehicle battery pack 30 (on the side of vehicle rear portion 10d). The position of wire harness 36 is not limited to the aforementioned position, and it may be provided on the vehicle front side relative to vehicle battery pack 30 (on the side of vehicle front portion 10c). Further, wire harness 36 may be drawn out from a side of vehicle battery pack 30 facing rocker 10a or tunnel 11.

Protection member 38 is attached to vehicle battery pack 30. Although protection member 38 has a shape of a pipe, its shape is not necessarily limited to a pipe, and it may be a solid member. Although protection member 38 is provided under front seat 20 in FIG. 1, it is not necessarily provided under front seat 20. Protection member 38 may extend off front seat 20 and may be provided between front seat 20 and a rear seat 23. A pair of front seats 20 and rear seat 23 formed as a bench seat are provided on floor panel 10.

Figure 2:
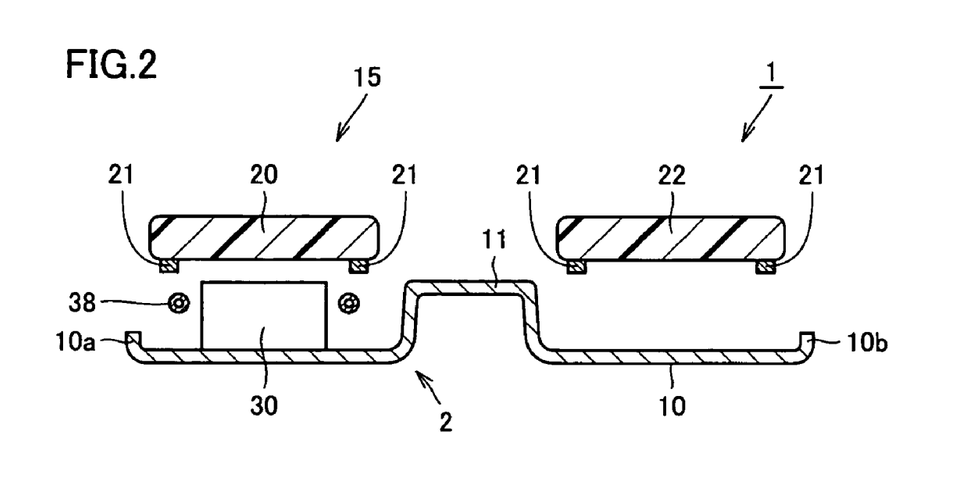
FIG. 2 is a cross sectional view along the line II-II in FIG. 1.

FIG. 2 is a cross sectional view along the line II-II in FIG. 1. Referring to FIG. 2, floor panel 10 has tunnel 11 provided in a central portion of the vehicle. Tunnel 11 is raised to protrude from floor panel 10. Vehicle battery pack 30 is provided adjacent to tunnel 11. Protection member 38 is provided on floor panel 10 to surround vehicle battery pack 30. Although protection member 38 is formed of a pipe member having a substantially circular section in FIG. 2, the shape of the section is not limited to a pipe. Further, the shape of the pipe is not limited to a circle, and may be an ellipse or a prism.

Figure 3:
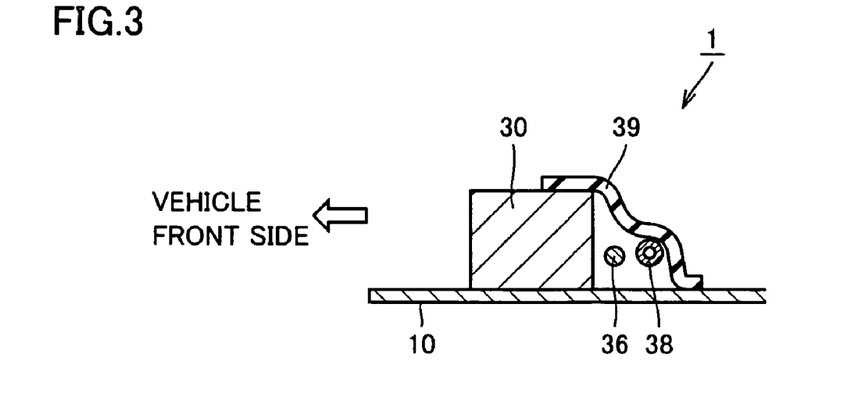
FIG. 3 is a cross sectional view along the line III-III in FIG. 1.

FIG. 3 is a cross sectional view along the line III-III in FIG. 1. Referring to FIG. 3, a cover 39 may be provided to cover vehicle battery pack 30, wire harness 36, and protection member 38 on floor panel 10. Cover 39 prevents protection member 38 and wire harness 36 from being exposed. Any cover providing good appearance may be used as cover 39. Furthermore, vehicle battery pack 30 can be protected further reliably by reinforcing cover 39.

Figure 4:
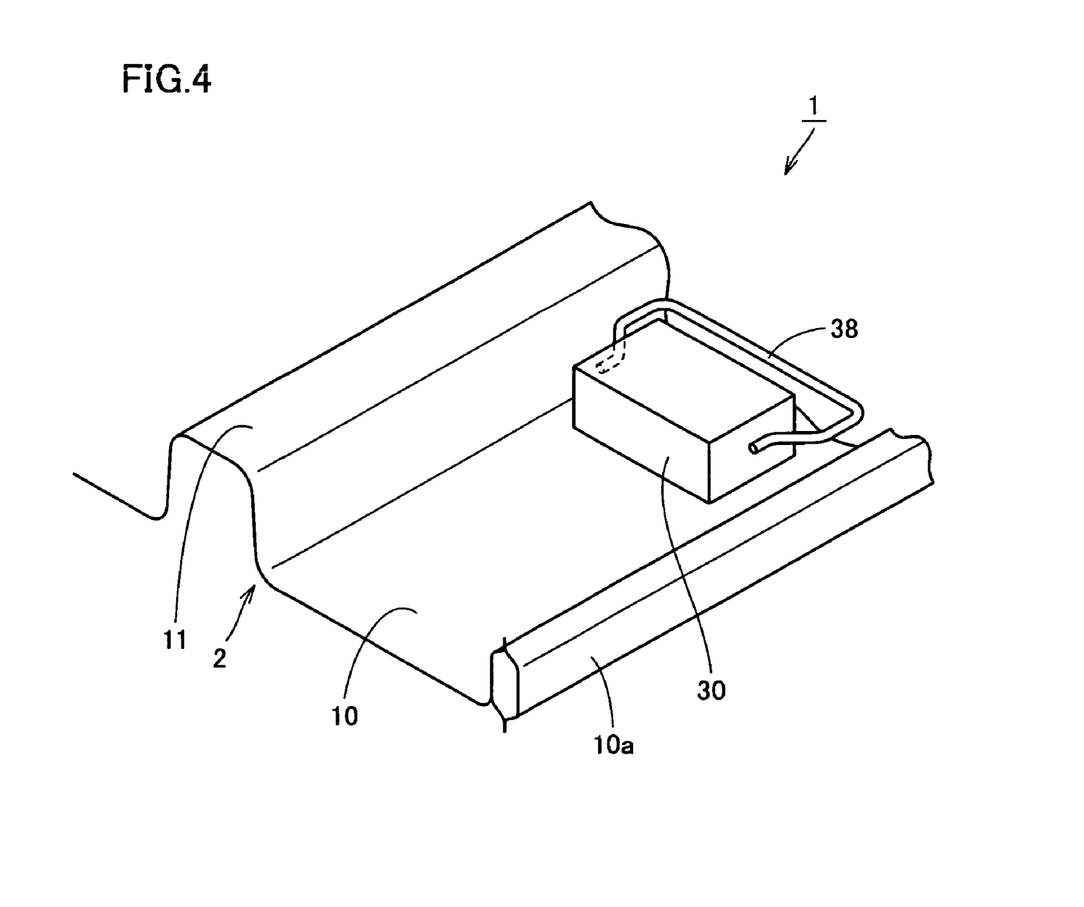
FIG. 4 is a perspective view of the mounting structure for a vehicle battery pack shown in FIG. 1.

FIG. 4 is a perspective view of the mounting structure for a vehicle battery pack shown in FIG. 1. Referring to FIG. 4, vehicle battery pack 30 is provided on floor panel 10 formed in a shape of a groove between tunnel 11 and rocker 10a. Protection member 38 is provided behind vehicle battery pack 30, that is, on the vehicle rear side. Protection member 38 may or may not be in contact with rocker 10a and tunnel 11.

Figure 5:
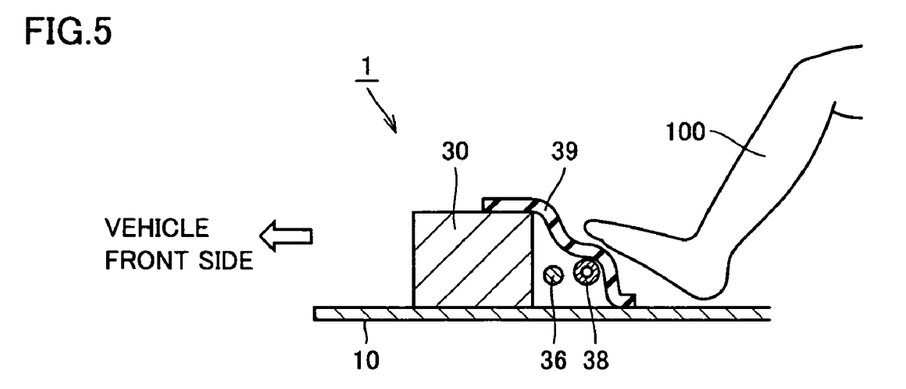
FIG. 5 is a cross sectional view of a mounting structure for a vehicle battery pack for illustrating a protection member serving as a footrest.

FIG. 5 is a cross sectional view of a mounting structure for a vehicle battery pack for illustrating a protection member serving as a footrest. Referring to FIG. 5, a passenger in a rear seat can rest his/her feet 100 on protection member 38 and cover 39, and thus protection member 38 can be utilized as a footrest step for a passenger in the rear seat.

In the mounting structure for a vehicle battery pack in accordance with the first embodiment of the present invention formed as described above, vehicle battery pack 30 and wire harness 36 can be protected by providing protection member 38.

Further, as shown in FIG. 5, protection member 38 can be utilized as a footrest step for a passenger in the rear seat.

SECOND EMBODIMENT

Figure 6:
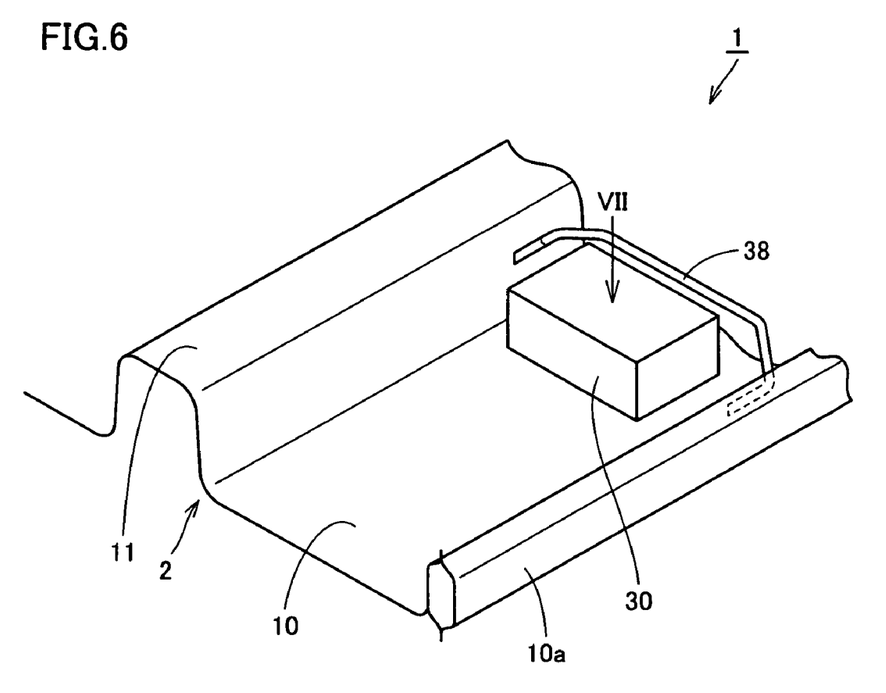
FIG. 6 is a perspective view of a mounting structure for a vehicle battery pack in accordance with a second embodiment of the present invention.
Figure 7:
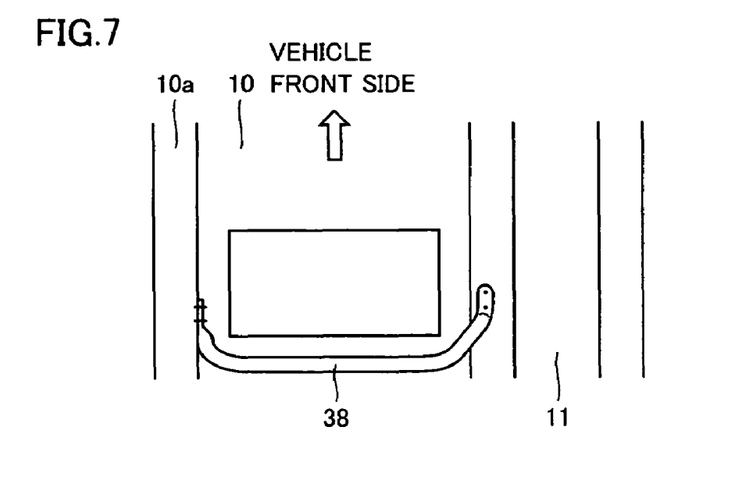
FIG. 7 is a plan view of the mounting structure for a vehicle battery pack seen from a direction indicated by an arrow VII in FIG. 6.

FIG. 6 is a perspective view of a mounting structure for a vehicle battery pack in accordance with a second embodiment of the present invention. FIG. 7 is a plan view of the mounting structure for a vehicle battery pack seen from a direction indicated by arrow VII in FIG. 6. Referring to FIGS. 6 and 7, mounting structure 1 for a vehicle battery pack in accordance with the second embodiment of the present invention is different from the mounting structure for a vehicle battery pack in accordance with the first embodiment in that protection member 38 is directly fastened to body 2. Specifically, in the second embodiment, protection member 38, which is a pipe-shaped protector, is attached to tunnel 11 and rocker 10a of body 2. To attach protection member 38, various joining methods which have been conventionally used, such as welding, riveted joint, or bolt connection can be used. It is to be noted that, in the first and the second embodiments, wire harness 36 may not be provided. The second embodiment illustrates a case where no wire harness is provided. Also in the second embodiment, protection member 38 is provided on the vehicle rear side relative to vehicle battery pack 30, and protects vehicle battery pack 30.

The mounting structure for a vehicle battery pack in accordance with the second embodiment of the present invention formed as described above has an effect similar to that of the mounting structure for a vehicle battery pack in accordance with the first embodiment. Further, since protection member 38 is not joined to vehicle battery pack 30, the strength of vehicle battery pack 30 can be reduced. As a result, weight reduction of vehicle battery pack 30 can be achieved.

THIRD EMBODIMENT

Figure 8:
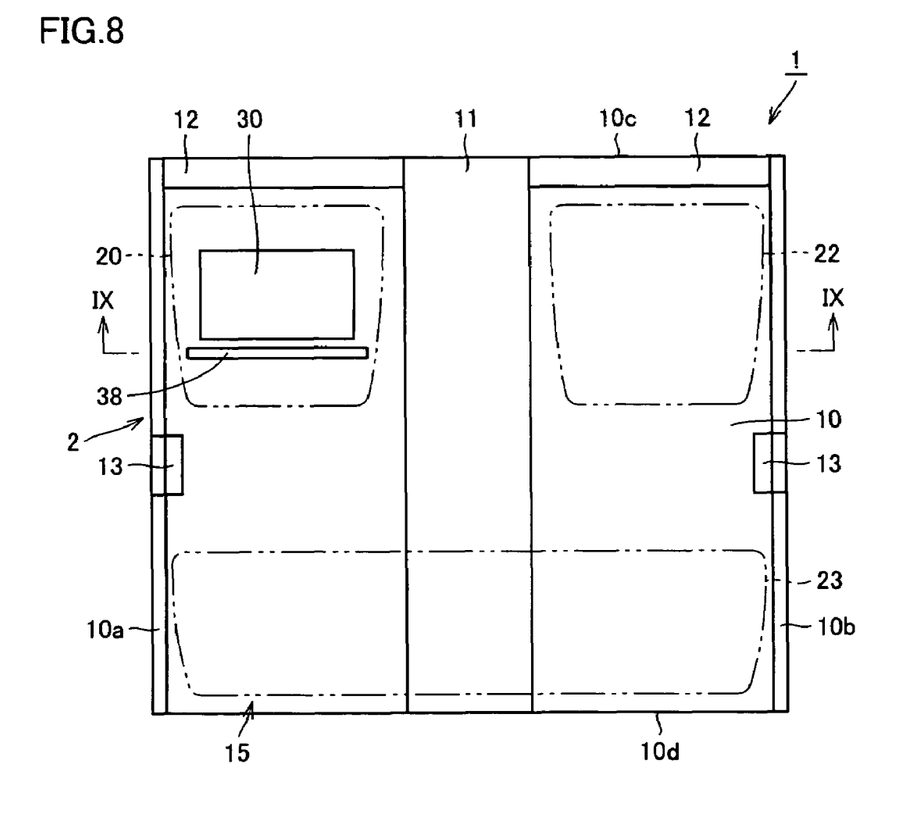
FIG. 8 is a plan view of a mounting structure for a vehicle battery pack in accordance with a third embodiment of the present invention.
Figure 9:
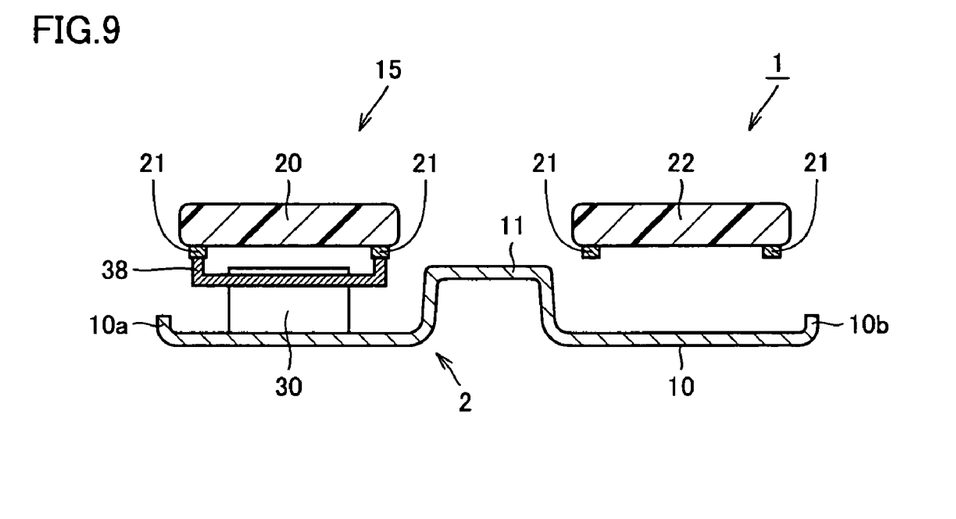
FIG. 9 is a cross sectional view seen along the line IX-IX in FIG. 8.

FIG. 8 is a plan view of a mounting structure for a vehicle battery pack in accordance with a third embodiment of the present invention. FIG. 9 is a cross sectional view seen along the line IX-IX in FIG. 8. Referring to FIGS. 8 and 9, the mounting structure for a vehicle battery pack in accordance with the third embodiment of the present invention is different from the mounting structures for a vehicle battery pack in accordance with the first and the second embodiments in that protection member 38 is attached to a seat rail 21. Since seat rail 21 is attached to floor panel 10, protection member 38 is attached to floor panel 10 via seat rail 21. Although protection member 38 is linear in FIGS. 8 and 9, it is not limited to this shape, and it may be in a meander shape. It may also be in a zigzag shape or a crank shape. Further, protection member 38 does not necessarily have a uniform thickness, and it may have a thick portion and a thin portion.

The mounting structure for a vehicle battery pack in accordance with the third embodiment of the present invention formed as described above also has an effect similar to those of the mounting structures for a vehicle battery pack in accordance with the first and the second embodiments.

Figure 10:
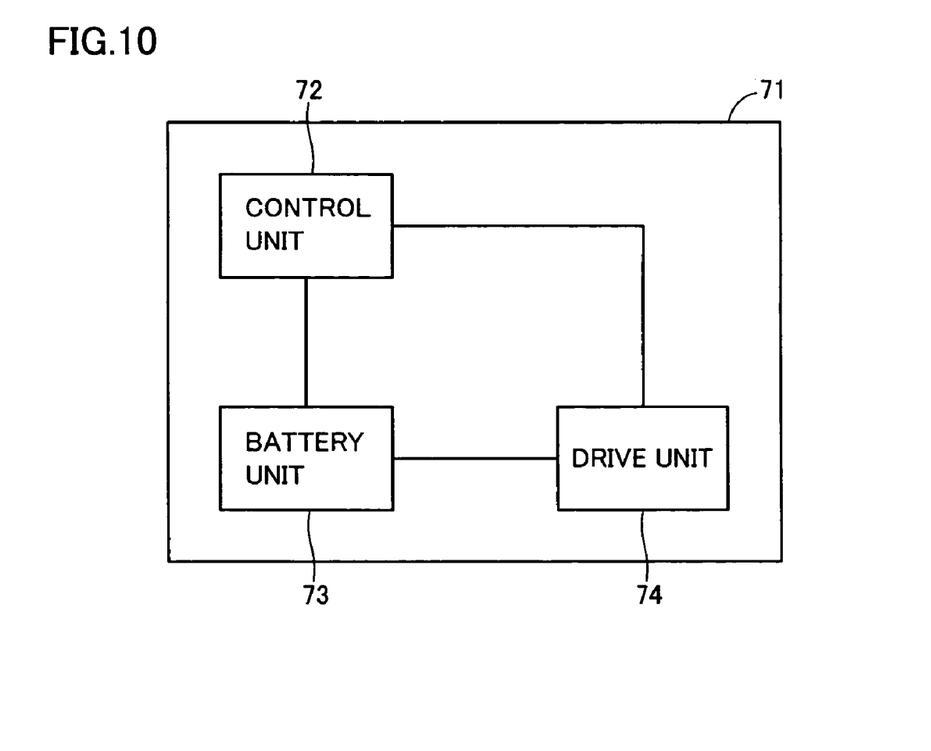
FIG. 10 is a block diagram illustrating a structure of a vehicle using a battery system including the mounting structure for a vehicle battery pack shown in FIGS. 1 to 9.

A vehicle employing the mounting structure for a vehicle battery pack in accordance with the present invention is formed as shown in FIG. 10. FIG. 10 is a block diagram illustrating a structure of a vehicle using a battery system including the mounting structure for a vehicle battery pack shown in FIGS. 1 to 9. Referring to FIG. 10, A vehicle 71 employing the mounting structure for a vehicle battery pack in accordance with the present invention has a control unit 72, a battery unit 73 including the mounting structure for a vehicle battery pack in accordance with the present invention, and a drive unit 74. Control unit 72 controls battery unit 73 and drive unit 74. Drive unit 74 includes an electric motor driven by a current supplied from battery unit 73. Other than an electric motor, drive unit 74 may include an internal combustion engine such as a gasoline engine or a diesel engine.

Specifically, vehicle 71 includes not only an electric vehicle employing only an electric motor driven by electricity supplied from battery unit 73 as a drive source, but also a so-called hybrid vehicle having drive means other than an electric motor, such as a gasoline engine, as a drive source. Further, battery unit 73 may supply electricity only to a cell motor.

While the embodiments of the present invention have been described, the embodiments herein described can be modified in various ways. Firstly, although the first to the third embodiments illustrate a case where vehicle battery pack 30 is provided under front seat 20, its position is not limited to the aforementioned position. The vehicle battery pack may be provided under a right front seat 22, rear seat 23, or a third seat. That is, the vehicle battery pack may be mounted under any seat.

Further, the front seat may be a bench seat. Furthermore, although vehicle battery pack 30 is mounted on the left side of the vehicle in the embodiments, vehicle battery pack 30 may be mounted on the right side of the vehicle. Further, it may be mounted on a driver seat side or a front passenger seat side, regardless of which is on the right side and which is on the left side of a vehicle. Preferably, it is mounted on a front passenger seat side, since a front passenger seat is less occupied.

FOURTH EMBODIMENT

Figure 11:
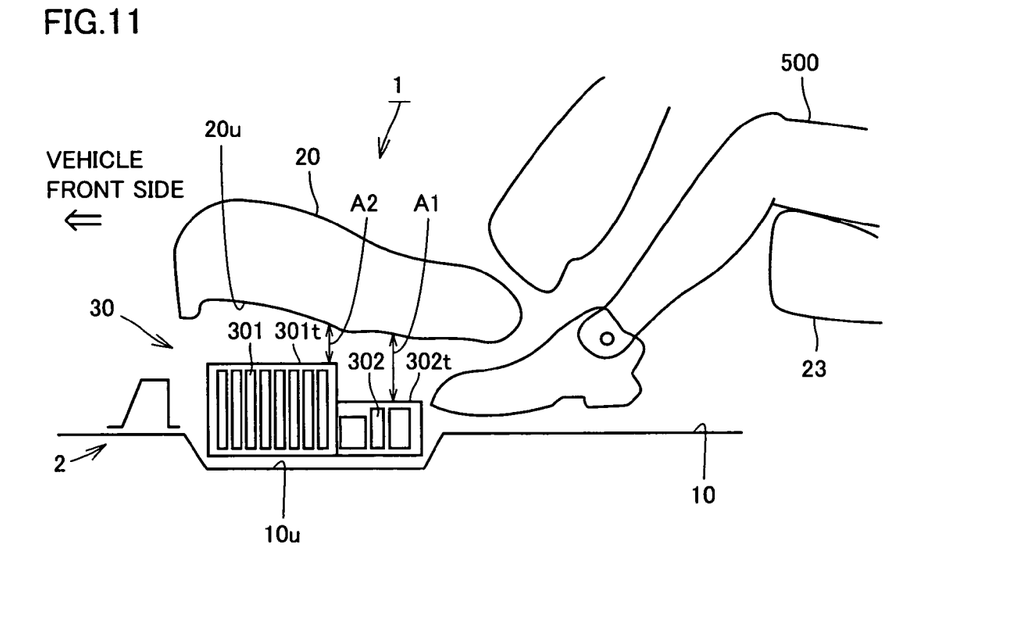
FIG. 11 is a cross sectional view of a mounting structure for a vehicle battery pack in accordance with a fourth embodiment of the present invention.

FIG. 11 is a cross sectional view of a mounting structure for a vehicle battery pack in accordance with a fourth embodiment of the present invention. Referring to FIG. 11, mounting structure 1 for a vehicle battery pack in accordance with the fourth embodiment of the present invention includes body 2 with floor panel 10, front seat 20 as a first seat provided on floor panel 10, rear seat 23 as a second seat provided on the vehicle rear side relative to front seat 20, and vehicle battery pack 30 provided under front seat 20. Vehicle battery pack 30 has a battery main body unit 301 and a device unit 302. Device unit 302 is provided on the vehicle rear side relative to Battery main body unit 301.

A distance A1 from a bottom surface 20u of front seat 20 to a top 302t of device unit 302 is greater than a distance A2 from bottom surface 20u of front seat 20 to a top 301t of battery main body unit 301. A concave portion 10u in which vehicle battery pack 30 is mounted is lower than floor panel 10 surrounding concave portion 10u.

In the present embodiment, vehicle battery pack 30 has battery main body unit 301 formed of a battery module, and device unit 302 formed of auxiliary device parts. The present embodiment illustrates a position of vehicle battery pack 30 which allows a passenger in the rear seat to insert his/her feet 500 smoothly and obtain a space for accommodating his/her toe when vehicle battery pack 30 is mounted under front seat 20. In the present embodiment, battery main body unit 301 is provided on the front side, and device unit 302 is provided on the rear side. It is to be noted that top 302t of device unit 302 is lower in height than top 301t of main body unit 301. Device unit 302 is formed of electric devices such as a converter, an inverter, and a condenser.

A protector or the like for protecting battery main body unit 301 and device unit 302 may be provided over battery main body unit 301 and device unit 302. A protection bar as illustrated in the first embodiment may also be provided.

Further, the vehicle battery pack in accordance with the present invention may be mounted under the second seat such that a passenger in the third seat can obtain a space for accommodating his/her toe.

Figure 12:
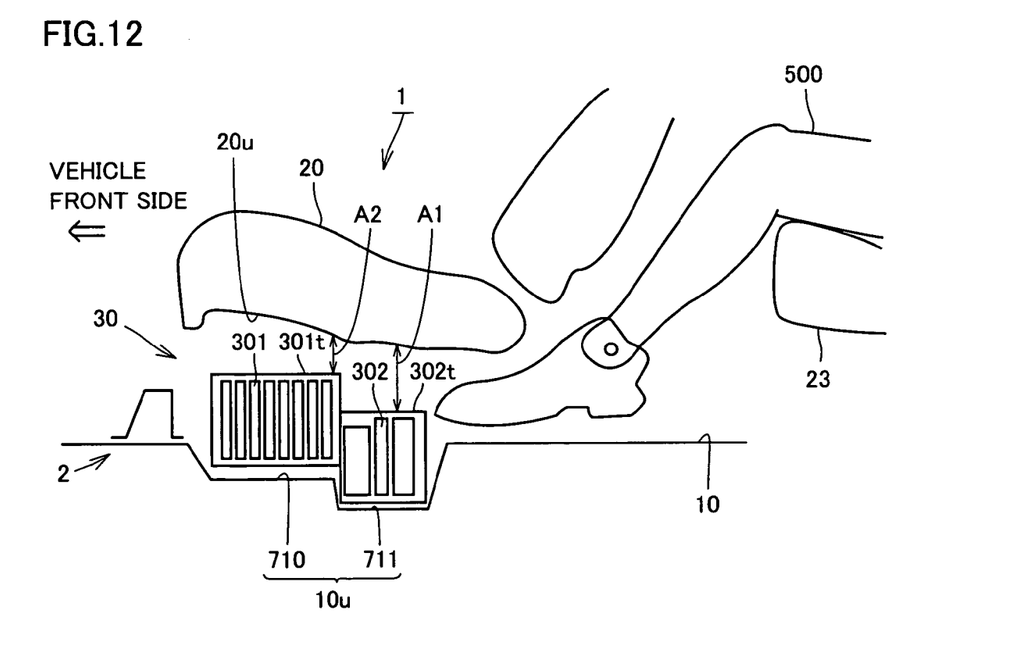
FIG. 12 is a cross sectional view of a mounting structure for a vehicle battery pack in accordance with a modification.
Figure 13:
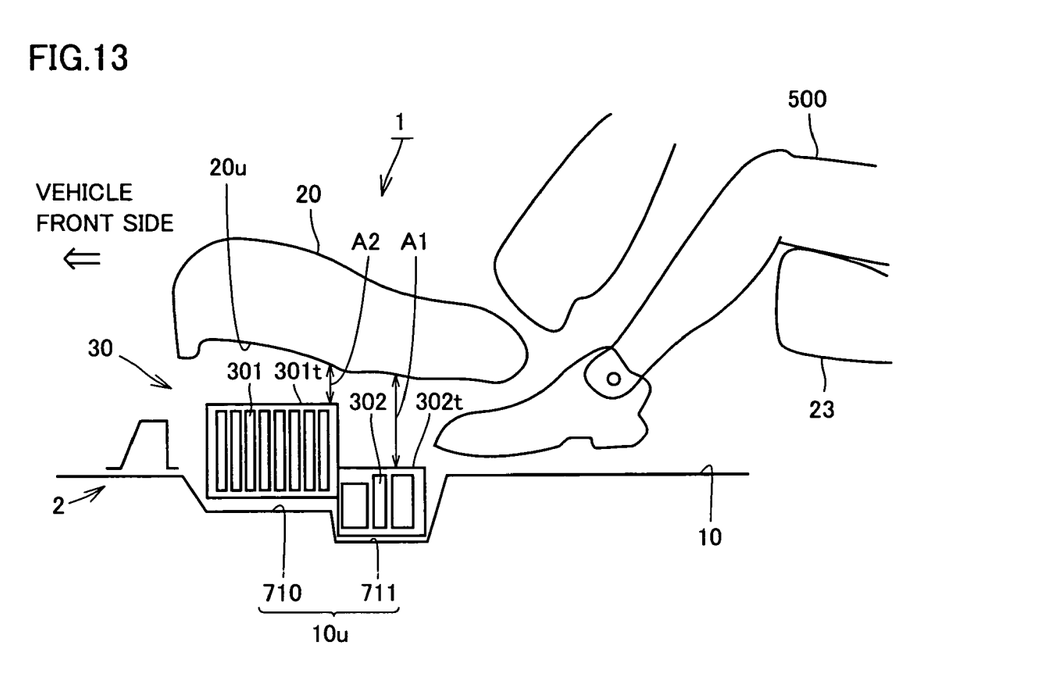
FIG. 13 is a cross sectional view of a mounting structure for a vehicle battery pack in accordance with a modification.

Each of FIGS. 12 and 13 is a cross sectional view of a mounting structure for a vehicle battery pack in accordance with a modification. Referring to FIG. 12, a portion 711 of floor panel 10 in which device unit 302 is mounted is lower than a portion 710 of floor panel 10 in which battery main body unit 301 is mounted. Specifically, concave portion 10u may have a stepped bottom surface and device unit 302 may be mounted in a lower portion of the bottom surface.

Referring to FIG. 13, device unit 302 may be formed such that top 302t of device unit 302 is substantially level with floor panel 10 on the vehicle rear side relative to device unit 302.

It should be understood that the embodiments herein disclosed are by way of illustration in all respects and not to be taken by way of limitation. The scope of the present invention is defined not by the above description but by the appended claims, and is intended to include all the modifications within the meaning and the scope equivalent to those of the claims.

The invention claimed is:

1. A mounting structure for a vehicle battery pack, comprising:
   a body with a floor panel,
   a seat provided on said floor panel,
   a vehicle battery pack provided under said seat, and
   a protection member provided only on a vehicle rear side relative to said vehicle battery pack and protecting the vehicle battery pack,
   wherein said floor panel has a tunnel extending from a vehicle front portion to a vehicle rear portion of said body, and a rocker provided on a side of said floor panel to extend parallel to said tunnel, and said vehicle battery pack is provided between said tunnel and said rocker.

2. The mounting structure for a vehicle battery pack according to claim 1, wherein said protection member is fastened to said body.

3. The mounting structure for a vehicle battery pack according to claim 1, wherein said seat is a front seat.

4. A mounting structure for a vehicle battery pack, comprising:
   a body with a floor panel,
   a first seat provided on said floor panel,
   a second seat provided on a vehicle rear side of said first seat, and
   a vehicle battery pack provided under said first seat,
   wherein said vehicle battery pack includes a battery main body unit and a device unit, and said device unit is provided on the vehicle rear side relative to said battery main body unit.

5. The mounting structure for a vehicle battery pack according to claim 4, wherein a distance from a bottom surface of said first seat to a top of said device unit is greater than a distance from the bottom surface of said first seat to a top of said battery main body unit.

6. The mounting structure for a vehicle battery pack according to claim 5, wherein a portion of said floor panel in which said device unit is mounted is lower than a portion of said floor panel in which said battery main body unit is mounted.

7. The mounting structure for a vehicle battery pack according to claim 5, wherein a portion of said floor panel in which said vehicle battery pack is mounted is lower than said floor panel surrounding the portion.

8. The mounting structure for a vehicle battery pack according to claim 4, wherein the top of said device unit is substantially level with said floor panel on the vehicle rear side relative to said device unit.

9. The mounting structure for a vehicle battery pack according to claim 4, wherein said first seat is a front seat.

* * * * *